(12) United States Patent
Humphrey

(10) Patent No.: US 8,161,720 B1
(45) Date of Patent: Apr. 24, 2012

(54) GRASS TREATMENT UNIT FOR WALK BEHIND GREENSMOWER

(76) Inventor: John L. Humphrey, St. Charles, MO (US)

( * ) Notice: Subject to any disclaimer, the term of this patent is extended or adjusted under 35 U.S.C. 154(b) by 0 days.

(21) Appl. No.: 12/960,113

(22) Filed: Dec. 3, 2010

Related U.S. Application Data

(60) Provisional application No. 61/266,386, filed on Dec. 3, 2009.

(51) Int. Cl.
*A01D 34/53* (2006.01)
(52) U.S. Cl. ............................ 56/249; 172/21
(58) Field of Classification Search .............. 56/249, 56/249.5, 17.2; 172/21, 118, 540; 37/243, 37/244
See application file for complete search history.

(56) References Cited

U.S. PATENT DOCUMENTS

| | | | | |
|---|---|---|---|---|
| 1,607,382 A * | 11/1926 | Zakrzewsky | .................... | 56/238 |
| 2,283,161 A * | 5/1942 | Booton | ........................ | 56/249.5 |
| 2,641,982 A * | 6/1953 | Harshberger | .................... | 172/40 |
| 3,603,162 A * | 9/1971 | Gohler | ............................. | 74/16 |
| 3,758,967 A * | 9/1973 | Thompson | ..................... | 37/242 |
| 3,783,592 A * | 1/1974 | Schraut | ........................... | 56/13.3 |
| 3,882,615 A * | 5/1975 | Williams | ......................... | 37/243 |
| 4,064,679 A * | 12/1977 | Spinner | ............................... | 56/2 |
| 4,833,800 A * | 5/1989 | Ting | ............................... | 37/243 |
| 5,052,135 A * | 10/1991 | Fontaine | ......................... | 37/243 |
| 5,261,213 A | 11/1993 | Humphrey | | |
| 6,182,383 B1 * | 2/2001 | Reed, Jr. | ........................ | 37/242 |
| 6,467,245 B1 | 10/2002 | Humphrey | | |
| 6,622,804 B2 * | 9/2003 | Schmitz et al. | .......... | 180/65.245 |
| 6,647,703 B2 * | 11/2003 | Oliver | ................................. | 56/2 |
| 6,945,021 B2 * | 9/2005 | Michel | ........................... | 56/249 |
| 7,134,516 B2 * | 11/2006 | Eisenhardt et al. | ...... | 180/65.235 |
| 7,191,584 B2 * | 3/2007 | Goman et al. | .................. | 56/249 |
| 7,257,909 B2 * | 8/2007 | Shaffer et al. | .................... | 37/242 |
| 7,588,389 B1 | 9/2009 | Humphrey | | |
| 7,610,975 B1 * | 11/2009 | Gust et al. | ............... | 180/65.245 |
| 7,624,560 B1 | 12/2009 | Humphrey | | |
| 7,836,614 B2 * | 11/2010 | Parker | ............................. | 37/246 |
| 7,866,068 B2 * | 1/2011 | Van Buren et al. | ............. | 37/244 |
| 2004/0149456 A1 * | 8/2004 | Jolliff et al. | ..................... | 172/42 |
| 2005/0097788 A1 * | 5/2005 | Wakitani et al. | ............... | 37/348 |
| 2006/0096136 A1 * | 5/2006 | Shaffer et al. | ................... | 37/244 |
| 2010/0064556 A1 * | 3/2010 | Lau | ................................... | 37/242 |
| 2010/0083628 A1 | 4/2010 | Humphrey | | |

* cited by examiner

*Primary Examiner* — Arpad Fabian-Kovacs
(74) *Attorney, Agent, or Firm* — Grace J. Fishel

(57) ABSTRACT

A grass treatment unit for various greens grooming practices for replacement of a cutting head on a walk behind greensmower. An adapter is provided for mounting the grass treatment unit on the walk behind greensmower and another adapter is provided for connecting the grass treatment unit to the power source previously used by the cutting head.

5 Claims, 8 Drawing Sheets

GRASS TREATMENT UNIT FOR WALK BEHIND GREENSMOWER

This application claims priority from provisional application Ser. No. 61/266,386, filed Dec. 3, 2009, for Grass Treatment Unit for Walk Behind Mower.

BACKGROUND OF THE INVENTION

1. Field of the Invention

The present invention relates to a grass treatment unit for various greens grooming practices, including vibratory and non-vibratory rolling, verticutting, scarifying, grooming, spiking, slitting, slicing, brushing and the like, said grass treatment unit adapted for mounting as a replacement for a cutting head on a walk behind greensmower.

2. Brief Description of the Prior Art

Grass treatment units are described in applicant's U.S. Pat. Nos. 5,261,213, 6,467,245, 7,588,389 and 7,624,560 and U.S. published application 2010/0083628, which are incorporated by reference herein. Much of the previous focus has been on providing greens grooming replacements for the cutting reels on a triplex mower. It would be desirable, however, if the same equipment could be adapted for use on a walk behind mower. Moreover, in some markets, there is a surplus of used walk behind mowers that might be put to another greens grooming practice. Of course, the same grass treatment unit for converting an old machine could be used on a new mower or one still used for mowing making it further multi-functional.

BRIEF SUMMARY OF THE INVENTION

In view of the above, it is an object of the present invention to provide a grass treatment unit adapted for mounting as a replacement for a cutting head on a walk behind greensmower. It is another object to provide extended utility for a walk behind greensmower, including a mower that has been retired from grass cutting service. Other objects and features of the invention will be in part apparent and in part pointed out hereinafter.

In accordance with the invention, a grass treatment unit for various greens grooming practices is adapted for mounting as a replacement for a cutting head on a walk behind greensmower. The grass treatment unit is powered by the mower with the power mechanism previously used for powering the cutting head. The grass treatment unit is mounted on structure otherwise provided for supporting the cutting head.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
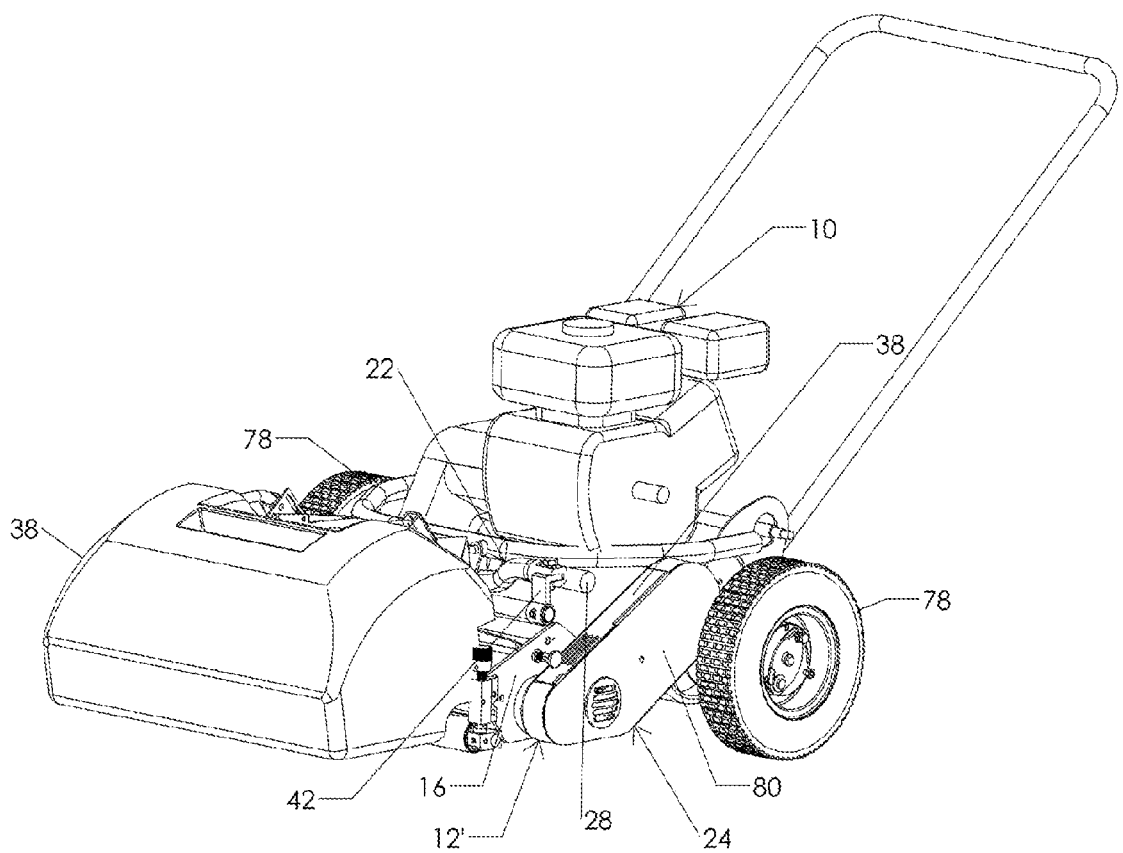
FIG. 1 is a left side perspective view of a walk behind greensmower with a multi-functional grass treatment unit.

Referring to the drawings more particularly by reference character, beginning with FIGS. 1-5, reference character 10 refers to a walk behind greensmower from which a cutting head has been removed and to which a grass treatment unit 12 in accordance with the present invention is attached. The particular walk behind greensmower illustrated in the drawings is a Toro Flex 21 but grass treatment unit 12 (illustrated as 12' and 12") may be used with other Toro models and with walk behind greensmowers sold by other manufacturers such as John Deere, Jacobsen and so forth as illustrated in FIGS. 8-13 and more particularly described below.

Figure 2:
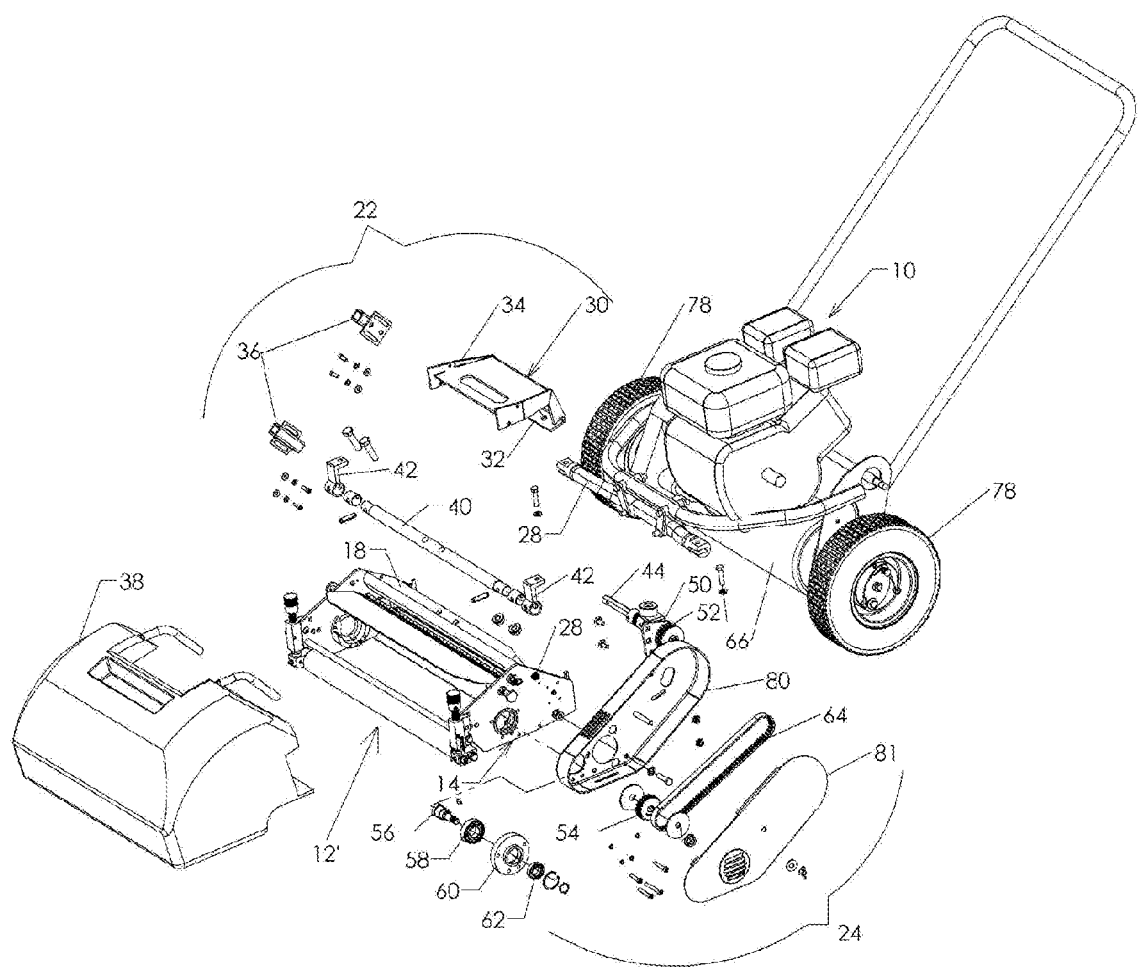
FIG. 2 is a left perspective view of the walk behind greensmower with the multi-functional grass treatment unit exploded.
Figure 3:
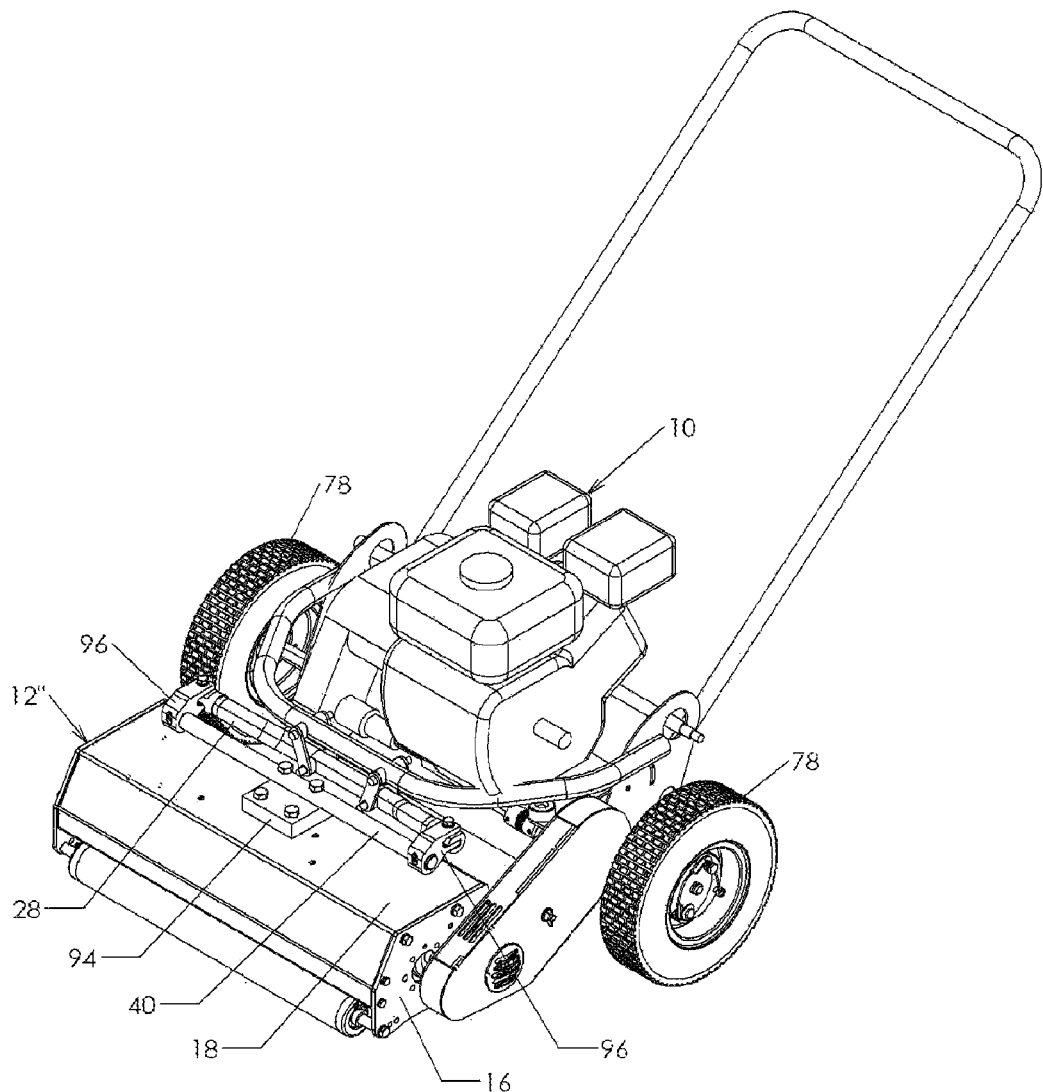
FIG. 3 is a left side perspective view of a walk behind greensmower with a vibrating roller grass treatment unit.
Figure 4:
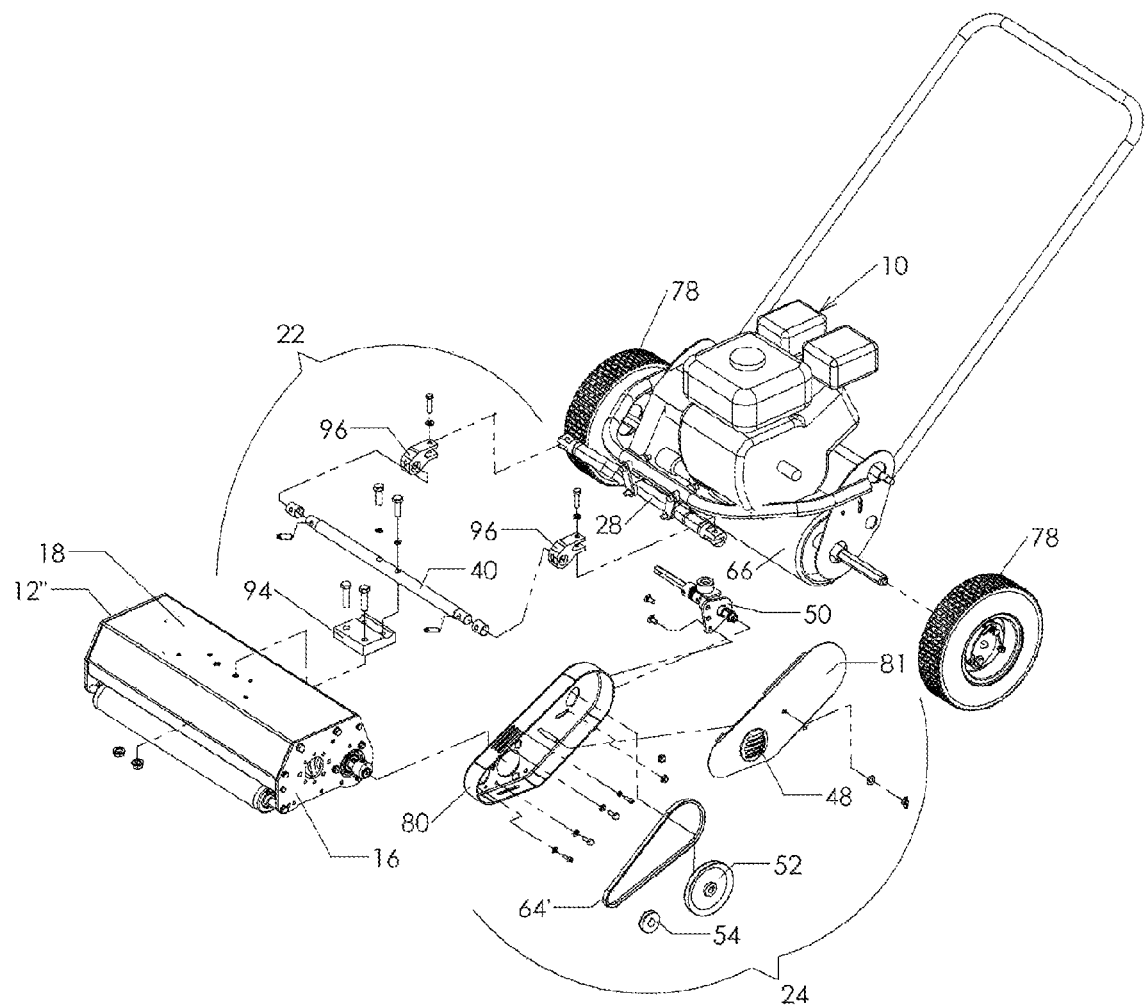
FIG. 4 is a left perspective view of the walk behind greensmower with the vibrating roller grass treatment unit exploded.

Multi-functional grass treatment unit 12' as shown in FIGS. 1-2 and vibrating roller grass treatment unit 12" as shown in FIGS. 3-4 includes a frame 14 with sidewalls 16 and at least one connecting cross member 18. A rotatable shaft is mounted between the sidewalls of frame 14 and a first adapter 22 is provided for mounting frame 14 to walk behind greensmower 10 as a replacement for the cutting head. A second adapter 24 is provided for powering the rotatable shaft with a power source that powered the cutting head which has been removed.

With continuing reference to FIGS. 1-2, multi-functional grass treatment unit 12' is as described in U.S. published application 2010/0083628 wherein the rotatable shaft is in a grass treatment insert as described therein. As illustrated in FIGS. 1-2, walk behind mower greensmower 10 has a floating bar 28 from which the cutting head has been detached and to which multi-functional grass treatment unit 12' is attached. For this purpose first adapter 22 includes a U-shaped bracket 30. A bottom leg 32 of bracket 30 is bolted to cross member 18 and a top leg 34 may be provided with a pair of clipping basket mounts 36 through which a clipping basket 38 from the cutting head may be reattached. A cross bar mounting shaft 40, opposite ends of which are provided with lift arms 42, is sandwiched in U-shaped bracket 30 and may be attached with the same bolts that attached U-shaped bracket to cross member 18. As shown in FIG. 1, lift arms 42 attach multi-functional grass treatment unit 12' to floating bar 28.

Figure 7:
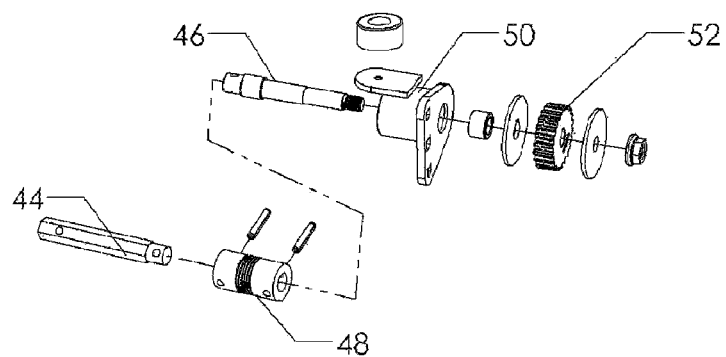
FIG. 7 is an exploded perspective view showing the transmission drive shaft for powering the grass treatment unit.

As shown in FIG. 2, second adapter 24 is a power train attached to a transmission drive shaft 44 which is shown in FIG. 7. A driven shaft 46 is attached to transmission drive shaft 44 by a flexible coupler 48. Driven shaft 46 is received in a bearing assembly 50 attached to the outside of a belt housing 80. A drive pulley 52 is attached for rotation with driven shaft 46 on the inside of belt housing 80. A driven pulley 54 is attached to a driven shaft 56 by which power is transmitted to the rotatable shaft of the grass treatment insert in multi-functional grass treatment unit 12'. In the form illustrated, driven shaft 56 is supported by an inner driven shaft bearing 58, a belt housing mounting ring 60 and an outer driven shaft bearing 62.

When drive pulley 52 and driven pulley 54 are gear pulleys they are connected with a synchronous belt 64. Drive gear pulley 52 and driven gear pulley 54 may have equal numbers of teeth such that they rotate in a one to one ratio. For some applications, however, it may be preferred that the gear pulleys 52, 54 have an unequal number of teeth such that the speed ratio of the rotatable shaft of the grass treatment insert 12 as compared to the drive gear pulley 52 which rotates in one to one ratio with transmission drive shaft 44 is either increased or decreased. For example, when the grass treatment insert in multi-functional grass treatment unit 12' is for non-vibratory rolling, verticutting, scarifying, grooming, spiking, slitting, slicing or brushing, it may be advantageous to slow down the rotation of the rotatable shaft. In this instance, drive gear pulley 52 has fewer teeth than driven gear pulley 54 such that the rotatable shaft is slowed down.

Figure 5:
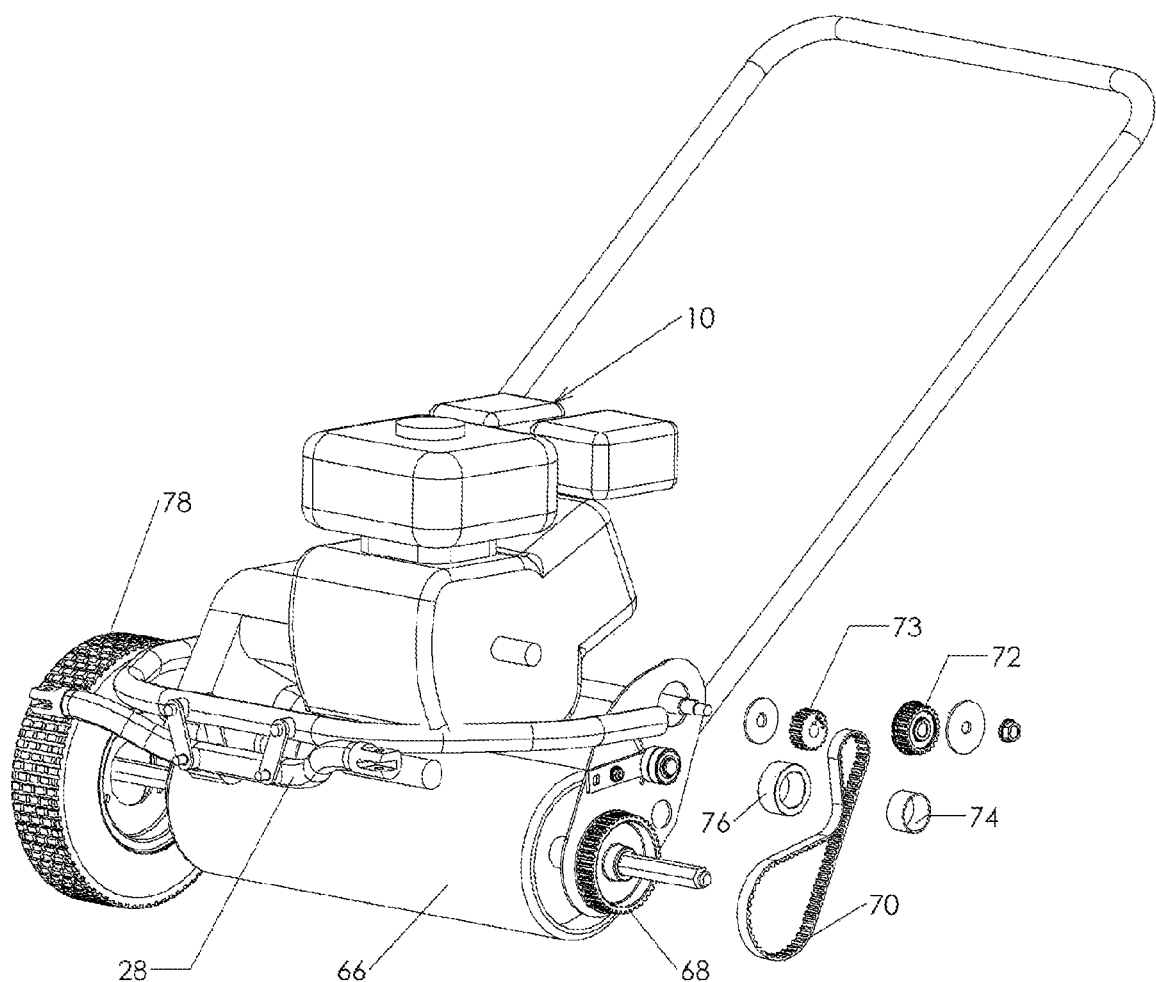
FIG. 5 is an exploded perspective view showing a means for speed reduction.

As shown in FIG. 5, walk behind greensmower 10 is propelled across a green by a rotating drum 66. With some walk behind greensmowers 10 there are controls on the machine to change ground speed but other machines such as the Toro Flex 21 have only one forward speed. In that instance drum 66 is driven by a 44-tooth driven pulley 68 connected with a synchronous belt 70 to a 22-tooth drive pulley 72. To slow walk behind greensmower 10 down, 22-tooth drive pulley 72 may be replaced with a pulley 73 with fewer teeth, for example 18. An idler pulley 74 provided with the Toro machine may be replaced with a thicker sleeve 76 to take up the slack in synchronous belt 70 such that it does not have to be replaced. Other alternatives include replacing the original synchronous belt 70 with a belt of appropriate length for replacement drive pulley 73 and eliminating the idler pulley.

Figure 6:
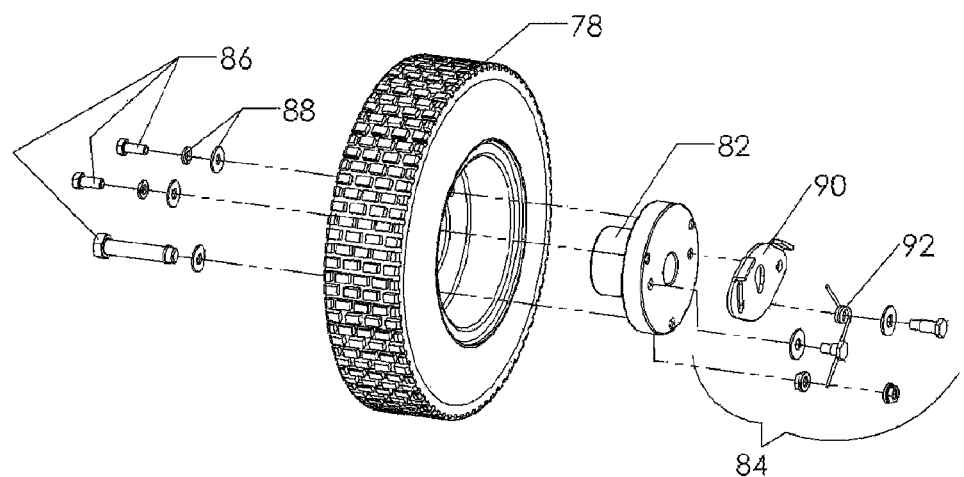
FIG. 6 is an exploded perspective view showing a transport wheel modification.

Walk behind greensmower 10 includes a pair of detachable transport wheels 78. Transport wheels 78 are used to suspend drum 66 such that walk behind greensmower 10 can be easily moved between the green and a cart or about a maintenance facility. In FIGS. 1-4, a belt housing 80 is provided over gear pulleys 52, 54. When belt housing 80 is wider than the belt housing associated with the cutting head, it may be necessary to lengthen the axle for the transport wheel 78 on the belt housing side. Referring now to FIG. 6, which is exploded to show an axle hub wheel extension 82 and a lock mechanism 84, mounting bolts 86 and washers 88 attach axle hub wheel extension 82 to wheel 78. While only axle hub wheel extension 82 need be replaced to increase the spacing of wheel 78, it may be more convenient to replace lock mechanism 84 with a new lockplate 90 and torsion spring 92 along with axle hub wheel extension 82. Axle hub wheel extension 82 need not be removed to use walk behind greensmower 10 as a mower with the cutting head reinstalled.

As shown in FIGS. 3-4, a vibrating roller grass treatment unit 12" such as described in U.S. Pat. No. 5,261,213, 6,467, 245 or 7,588,389 may be used as a replacement for the cutting head. In this instance first adapter 22 includes cross bar mounting shaft 40 which is attached to vibrating roller grass treatment unit 12" through a mounting block 94. A bushing allows a hitch 96 to pivot on cross bar mounting shaft 40. Hitches 96 attached vibrating roller grass treatment unit 12" to floating bar 28 of walk behind greensmower 10. As with multi-functional grass treatment unit 12', belt housing 80 is attached to a sidewall 16 of frame 14 and transmission drive shaft 44 is coupled to drive pulley 52 which powers a driven pulley 54 by V-belt 64'. Driven pulley 54 is of smaller diameter than drive pulley 52 to increase the speed at which an unbalanced vibratory shaft rotates in vibrating roller grass treatment unit 12" and thus control vibration. Variable eccentric weights such as described in U.S. Pat. No. 7,588,389 may also be used to increase or decrease the amplitude of the vibrations. In which case, a cover 81 of belt housing 80 may be slotted 98 such that the outboard eccentric weights may be accessed without removing the belt cover.

Figure 8:
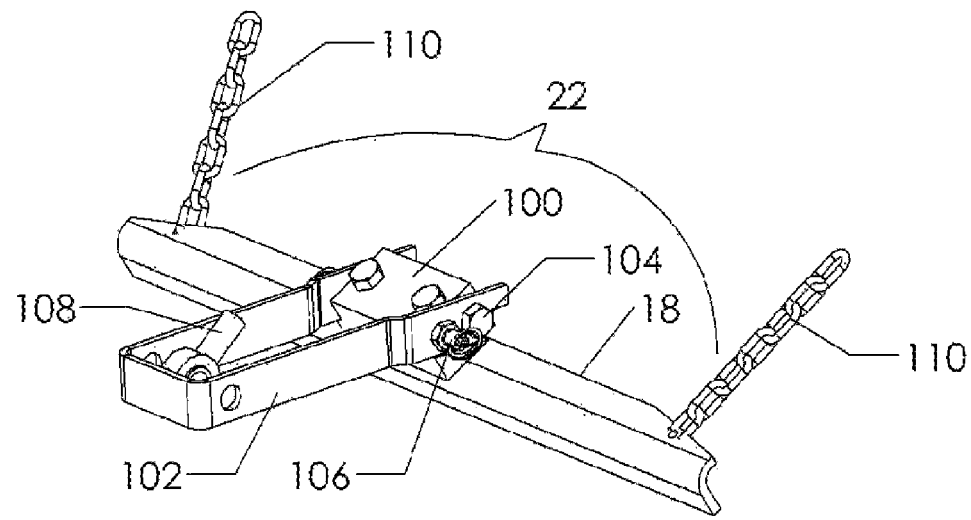
FIG. 8 is a perspective view of an adapter for attaching a multifunctional grass treatment unit to a John Deere 220E walk behind greensmower.
Figure 9:
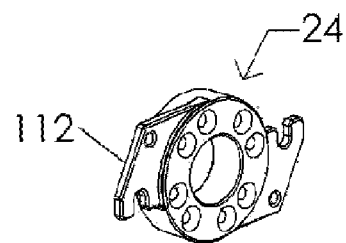
FIG. 9 is a perspective view of an adapter for attaching an electric motor from a John Deere 220E walk behind greensmower to a multifunctional grass treatment unit.

Turning now to FIGS. 8 and 9, first and second adapters 22, 24 are shown for attaching multi-functional grass treatment unit 12' to a John Deere 220E walk behind greensmower. First adapter 22 includes a hitch block 100 which is bolted to connecting cross member 18. A U-shaped hitch arm 102 is pivoted on a pivot bolt 104 in hitch block 100 between a generally horizontal and a generally vertical position under control of a spring loaded retractable plunger 106. Hitch arm 102 is attached to a draw bar 108 which is part of walk behind greensmower 10 and from which the cutting head is removed. First adapter 22 further includes a pair of lifting chains 110 which are also part of walk behind greensmower 10 and from which the cutting head is removed. Chains 110 are used to lift and stabilize multi-functional grass treatment unit 12'. When hitch arm 102 is in vertical position, the grass treatment insert may be removed from multi-functional grass treatment unit 12' and replaced with a different grass treatment insert for non-vibratory rolling, verticutting, scarifying, grooming, spiking, slitting, slicing, brushing and the like. Second adapter 24 is an attachment flange 112 by means of which an electric motor which has been detached from the cutting head is attached to multi-functional grass treatment unit 12'.

Figure 10:
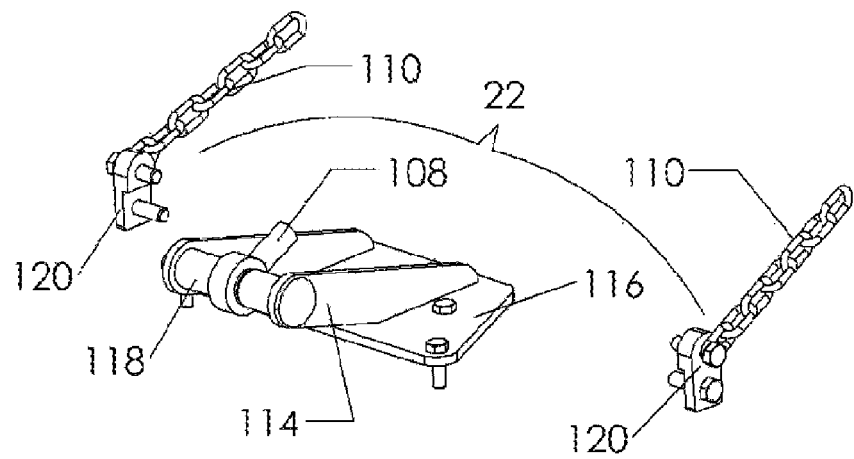
FIG. 10 is a perspective view of an adapter for attaching a vibrating roller grass treatment unit to a John Deere 220E walk behind greensmower.

In FIGS. 9 and 10, first and second adapters 22, 24 are shown for attaching vibrating roller grass treatment unit 12" to a John Deere 220E walk behind greensmower. First adapter 22 includes a roller hitch 114 which is attached to a plate 116 bolted to connecting member 18. Roller hitch 114 has a hitch pin 118 by means of which roller hitch 114 is attached to draw bar 108 of the walk behind greensmower. Mounting tabs 120 are provided for connecting lifting chains 110 to sidewalls 16 of frame 14. Lifting chains 110, as explained above, are part of walk behind greensmower and from which the cutting head is removed. Second adapter 24 is the same as in FIG. 9.

Figure 11:
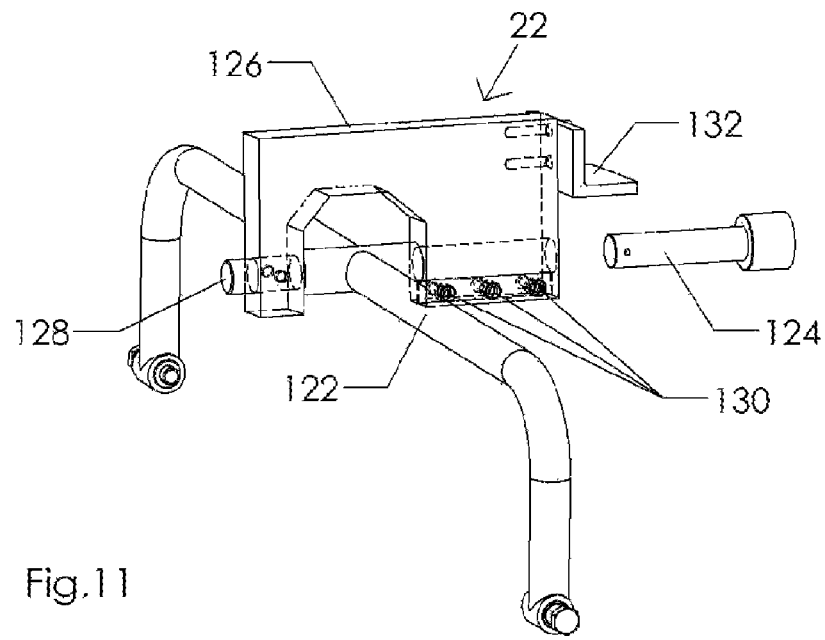
FIG. 11 is a perspective view of an adapter for attaching a multifunctional grass treatment unit to a Jacobsen Eclipse 122 Floating Head walk behind greensmower.
Figure 12:
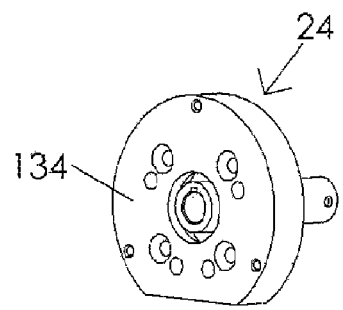
FIG. 12 is a perspective view of an adapter for attaching an electric motor from a Jacobsen Eclipse 122 Floating Head walk behind greensmower to a multifunctional grass treatment unit.

FIG. 11 illustrates first adapter 22 for mounting multi-functional grass treatment unit 12' to a Jacobsen Eclipse 122 Floating Head walk behind greensmower 10. In this instance a yoke 122 which is part of walk greensmower 10 is detached from the cutting head and reattached to a kingpin 124 which is also part of the mower through a kingpin extension 126 as shown. Yoke mounting pin 128 connects yoke 122 to kingpin extension 126. As kingpin extension 126 is seated on kingpin 124 and locked in place with screws 130, an extension stabilizer 132 slides over a flat portion of the frame of the walk behind greensmower to stop rotation of kingpin extension 126 about kingpin 124. Second adapter 24 is illustrated in FIG. 12 and comprises a flange 134 adapted to connect with the electric motor provided for the cutting head.

Figure 13:
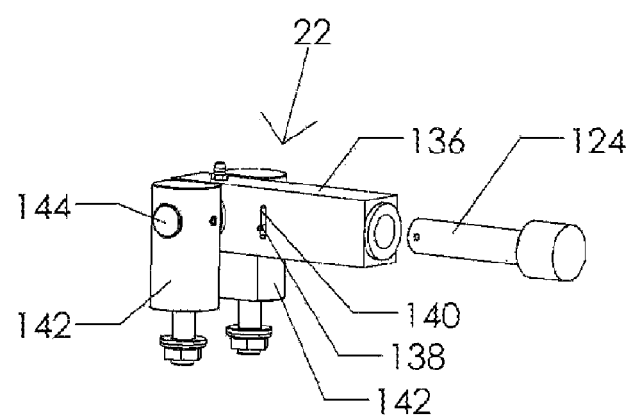
FIG. 13 is a perspective view of an adapter for attaching a vibrating roller grass treatment unit to a Jacobsen Eclipse 122 Floating Head walk behind greensmower.

An adapter 22 suitable for mounting vibrating roller grass treatment unit 12" to a Jacobsen Eclipse 122 Floating Head walk behind greensmower 10 is shown in FIG. 13. A kingpin sleeve 136 is mounted on kingpin 124 and secured thereon with a kingpin retainer 138. An elongated slot 140 is provided in kingpin sleeve 136 to permit limited twist and up and down movement of the kingpin in the sleeve. A pair of bolsters 142 are pivotably attached by a bolster pin 144 to kingpin sleeve 136. Bolsters 142 are attached to cross member 18 of vibrating roller grass treatment unit 12". Bolster pin 144 allows limited fore and aft pivot of vibrating roller grass treatment unit 12" on bolsters 142 to accommodate undulations in the turf. Second adapter 24 may be the same as in FIG. 12.

While specific adapters 22, 24 have been described for particular models of walk behind greensmowers 10, it will be understood that other adapters may be developed for the same or other machines. The central feature of each first adapter 22 being a means to mount frame 14 to walk behind greensmower 10 in lieu of the cutting head. In like manner, the central feature of each second adapter 24 is the attachment of the power source for the cutting head to the rotatable shaft in grass treatment unit 12.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A grass treatment unit adapted to fit a walk behind greensmower from which a cutting head powered by a transmission drive shaft has been removed, said greensmower having right and left transport wheels for attachment to an axle, said grass treatment unit comprising
 a frame with sidewalls and at least one connecting cross member adapted to mount a rotatable shaft, said frame mountable by the connecting cross member as a replacement for the cutting head,
 a coupler adapted to connect the transmission drive shaft to a drive pulley mounted on the outside of one of the sidewalls, said one of the sidewalls being the pulley side of the frame,
 a driven pulley mounted on the outside of the sidewall on the pulley side of the frame and adapted to be connected to the rotatable shaft, said drive and driven pulleys connected with a belt, and
 a hub with an axle hub wheel extension, said hub adapted for attachment to the transport wheel on the pulley side of the frame, said axle hub wheel extension adapted for attachment to the axle, said axle hub wheel extension spacing the transport wheel on the pulley side of the frame out a distance to accommodate the drive and driven pulleys.

2. The grass treatment unit of claim 1 wherein the drive and driven pulleys are gear pulleys and the belt is a synchronous belt.

3. The grass treatment unit of claim 2 wherein the drive gear pulley and the driven gear pulley have an unequal number of teeth such that the speed ratio of the transmission drive shaft and the rotatable shaft is other than 1:1 whereby the speed of the rotatable shaft as compared to the speed of the transmission drive shaft is either increased or decreased.

4. The grass treatment unit of claim 2 wherein the rotatable shaft is that of a grass treatment insert in a multi-functional grass treatment unit for non-vibratory rolling, verticutting, scarifying, grooming, spiking, slitting, slicing or brushing and the drive gear pulley has more or less teeth than the driven gear pulley such that the speed of the rotatable shaft of the grass treatment insert is increased or decreased.

5. The grass treatment unit of claim 2 wherein the rotatable shaft is that of a vibratory roller grass treatment unit and the drive pulley is larger or smaller than the driven pulley such that the speed of the rotatable shaft in the vibratory roller grass treatment unit is increased or decreased.

* * * * *